United States Patent
Lee et al.

(10) Patent No.: US 8,637,840 B2
(45) Date of Patent: Jan. 28, 2014

(54) EUV PROJECTION LENS AND OPTIC SYSTEM HAVING THE SAME

(75) Inventors: Dong-Gun Lee, Hwaseong-si (KR); Seong-Sue Kim, Seoul (KR); Hwan-Seok Seo, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 196 days.

(21) Appl. No.: 12/805,003

(22) Filed: Jul. 7, 2010

(65) Prior Publication Data
US 2011/0042587 A1 Feb. 24, 2011

(30) Foreign Application Priority Data
Aug. 20, 2009 (KR) .................. 10-2009-0077086

(51) Int. Cl.
*G02B 5/18* (2006.01)

(52) U.S. Cl.
USPC .......... 250/504 R; 359/558; 359/563; 359/568

(58) Field of Classification Search
USPC .......... 359/350, 355, 358, 361, 558, 565, 566, 359/569; 250/492.1, 492.2, 493.1, 504 R
See application file for complete search history.

(56) References Cited

U.S. PATENT DOCUMENTS

| | | | | |
|---|---|---|---|---|
| 5,195,072 A * | 3/1993 | Fukui et al. | ................. | 369/44.23 |
| 5,995,285 A * | 11/1999 | Unno | ............................ | 359/565 |
| 7,268,945 B2 | 9/2007 | Yun et al. | | |
| 2004/0119962 A1* | 6/2004 | Omura | ............................ | 355/67 |
| 2005/0032378 A1* | 2/2005 | Yu et al. | ........................ | 438/689 |
| 2005/0122593 A1 | 6/2005 | Johnson | | |
| 2008/0259458 A1* | 10/2008 | LaFontaine et al. | .......... | 359/576 |

FOREIGN PATENT DOCUMENTS

| KR | 1999-13244 | 6/1994 |
|---|---|---|
| KR | 10-2003-0051206 | 6/2003 |

* cited by examiner

*Primary Examiner* — Nicole Ippolito
(74) *Attorney, Agent, or Firm* — Harness, Dickey & Pierce, P.L.C.

(57) ABSTRACT

An EUV projection lens includes a substrate and concentric diffraction patterns on the substrate. The concentric diffraction patterns have an out-of phase height with respect to EUV light and include a material through which the EUV light has a transmittance higher than about 50% at the out-of phase height. The EUV projection lens has a high first order diffraction light efficiency and an optic system having the EUV projection lens has a high resolution.

21 Claims, 6 Drawing Sheets

104  104a  104b  102

EUV PROJECTION LENS AND OPTIC SYSTEM HAVING THE SAME

CLAIM OF PRIORITY

This application claims priority under 35 USC §119 to Korean Patent Application Nos. 10-2009-0077086, filed on Aug. 20, 2009 in the Korean Intellectual Property Office (KIPO), the contents of which are herein incorporated by reference in their entirety.

BACKGROUND

1. Field

Example embodiments relate to an extreme ultraviolet (EUV) projection lens and an, optic system having the same. More particularly, example embodiments relate to an EUV projection lens having a high transmittance and an optic system having the same.

2. Description of the Related Art

As semiconductor devices have been highly integrated, forming more complex and fine patterns on a wafer becomes more important. Recently, an extreme ultraviolet (EUV) light source has been studied instead of a krypton fluoride (KrF) light source having a wavelength of 248 nm or an argon fluoride (ArF) light source having a wavelength of 193 nm in an exposure process because resolution may be increased by using a light source having a smaller wavelength. In an EUV lithography process, an EUV light source having a wavelength in a range of 13 nm to 14 nm may be used, and a photomask that may be used in the EUV lithography process needs to be developed. A various optic system using the EUV light source is also needed so that each pattern of the photomask may be inspected.

However, EUV light may have a very low transmittance and a high absorptance, and thus a visible light projection lens may not be used for the above optic system. Accordingly, an optic system using EUV light may use a mirror coated with multilayers reflecting EUV light as a condensing lens.

The reflection mirror may have a complex multilayered structure so that the mirror may have low surface quality and be expensive. Further, the aberration and alignment of the mirror may not be optimized. Thus, an EUV projection lens that is cheap and usable for an optic system using EUV light is required.

SUMMARY

Example embodiments provide an EUV projection lens having high transmittance and high resolution.

Example embodiments provide an optic system including the EUV projection lens having high transmittance and high resolution.

According to example embodiments, there is provided an EUV projection lens. The EUV projection lens may include a substrate and concentric diffraction patterns on the substrate. The concentric diffraction patterns may have an out-of phase height with respect to EUV light and include a material through which the EUV light has a transmittance higher than about 50% at the out-of phase height.

In example embodiments, the concentric diffraction patterns may have a height of less than about 80 nm.

In example embodiments, the concentric diffraction patterns may have a height of about 45 nm to about 65 nm.

In example embodiments, the concentric diffraction patterns may include ruthenium.

In example embodiments, line widths of and distances between the concentric diffraction patterns may become smaller as the concentric diffraction patterns are more distant from a central portion of the substrate.

In example embodiments, an outermost pattern of the concentric diffraction patterns may have a line width of about 30 nm to about 100 nm, and a distance between the outermost pattern and an adjacent pattern of the concentric diffraction pattern may be in a range of about 30 nm to about 100 nm.

In example embodiments, the concentric diffraction patterns may have a height substantially the same as each other.

In example embodiments, sidewalls of the concentric diffraction patterns may be vertical to the substrate.

In example embodiments, the concentric diffraction patterns may have a disk pattern on the central portion of the substrate and a plurality of concentric patterns around the disk pattern.

According to example embodiments, there is provided an optic system. The optic system may include a light source emitting EUV light, a detector receiving the EUV light, a stage on which a test sample is loaded, a condenser lens and a EUV projection lens. The stage may be spaced apart from the light source. The condenser lens may be disposed between the light source and the stage and may concentrate the EUV light emitted from the light source to provide the concentrated EUV light to the test sample. The EUV projection lens may be disposed between the stage and the detector to condense the EUV light reflected from the test sample and provide the condensed EUV light to the detector. The EUV projection lens may include concentric diffraction patterns on the substrate. The concentric diffraction patterns may have an out-of phase height with respect to the EUV light and include a material through which the EUV light has a transmittance higher than about 50% at the out-of phase height.

In example embodiments, the test sample may include a photomask usable in a photolithography process using EUV light as a light source.

In example embodiments, the concentric diffraction patterns may have a height of less than about 80 nm.

In example embodiments, the concentric diffraction patterns may have a height in a range of about 45 nm to about 65 nm.

In example embodiments, the concentric diffraction patterns of the EUV projection lens may include ruthenium.

In example embodiments, line widths of and distances between the concentric diffraction patterns may become smaller as the concentric diffraction patterns are more distant from a central portion of the substrate.

In example embodiments, an outermost pattern of the concentric diffraction patterns may have a line width of about 30 nm to about 100 nm, and a distance between the outermost pattern and an adjacent pattern of the concentric diffraction pattern may be in a range of about 30 nm to about 100 nm.

In example embodiments, the concentric diffraction patterns may have a height substantially the same as each other.

In example embodiments, sidewalls of the concentric diffraction patterns may be vertical to the substrate.

In example embodiments, the concentric diffraction patterns may have a disk pattern on the central portion of the substrate and a plurality of concentric patterns around the disk pattern.

BRIEF DESCRIPTION OF THE DRAWINGS

Example embodiments will be more clearly understood from the following detailed description taken in conjunction with the accompanying drawings, in which.

DETAILED DESCRIPTION OF THE EMBODIMENTS

Figure 1:
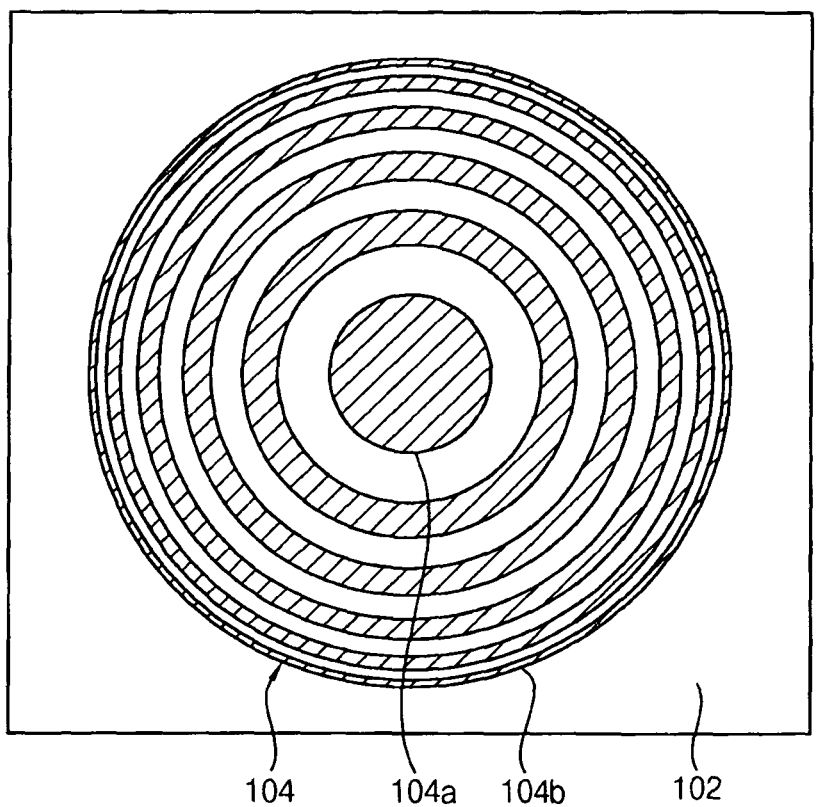
FIG. 1 is a top view illustrating an EUV projection lens in accordance with example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this description will be thorough and complete, and will fully convey the scope of the present inventive concept to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Extreme Ultraviolet (EUV) Projection Lens

Figure 2:
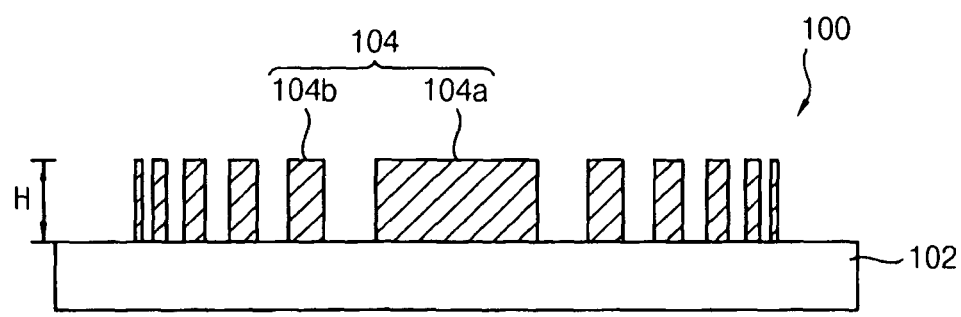
FIG. 2 is a cross-sectional view illustrating an EUV projection lens in accordance with example embodiments.
Figure 3:
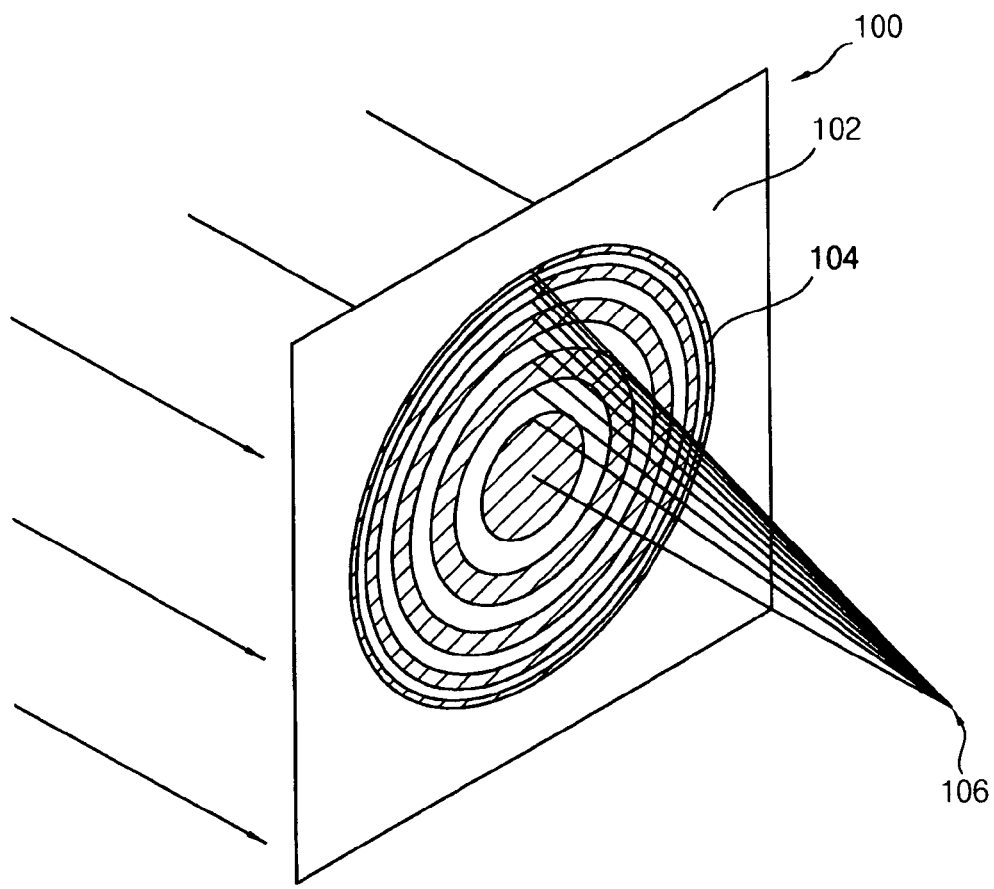
FIG. 3 is a schematic view illustrating a EUV light condensed by the EUV projection lens in FIG. 1.

FIG. 1 is a top view illustrating an EUV projection lens in accordance with example embodiments. FIG. 2 is a cross-sectional view illustrating the EUV projection lens in accordance with example embodiments. FIG. 3 illustrates an EUV light condensed by the EUV projection lens in accordance with example embodiments.

Referring to FIGS. 1 to 2, an EUV projection lens 100, e.g., an EUV zone plate lens, may include a diffraction pattern on a substrate 102.

Particularly, the diffraction pattern 104 may include a disk pattern 104a on a central portion of the substrate 102 and a plurality of concentric patterns 104b around the disk pattern 104a. The concentric patterns 104b may have, e.g., a concentric ring shape. Line widths of the concentric patterns 104b and distances between the concentric patterns 104b may become smaller as the concentric patterns 104b are more distant from the disk pattern 104a. A resolution of an optic system having an EUV projection lens may be higher when the concentric patterns 104b have a smaller line width or a smaller distance therebetween. In example embodiments, an outermost concentric pattern 104b may have a line width of about 30 nm to about 100 nm. Additionally, the distance between the outermost concentric pattern 104b and an adjacent concentric pattern 104b may be also about 30 nm to about 100 nm. In example embodiments, spaces may be provided between the concentric patterns 104b and between the disk pattern 104a and an innermost concentric pattern 104b to expose a top surface of the substrate 102.

For example, the substrate 102 may include a non-limiting material such as silicon nitride ($Si_3N_4$). In an example embodiment, the substrate 102 may have a thickness of about 50 nm to about 200 nm.

The EUV projection lens 100 may condense EUV light using first order diffraction lights passing through the diffraction patterns 104 on the substrate 102, which may serve as diffraction gratings. As illustrated in FIG. 3, EUV light passing through the EUV projection lens 100 may be diffracted by the diffraction patterns 104 and condensed to a focal point 106.

As illustrated above, a projection lens through which light passes and by which the light is diffracted may be called as a zone plate lens.

EUV light serving as a light source of an EUV zone plate lens may have low transmittance for many materials. That is, the EUV zone plate lens may absorb most of the EUV light so that first order diffraction lights condensed to a focal point may have a very small amount. Accordingly, optimizing diffraction patterns of the EUV zone plate lens to increase the amount of the first order diffraction lights is needed.

In example embodiment, the diffraction patterns 104 may have a height H so that EUV light passing through the diffraction patterns 104 may be out of phase. Particularly, the height H of the diffraction patterns 104 may be adjusted so that a phase shift of 180° may occur between EUV lights passing through the diffraction patterns 104 and those passing through the spaces between the diffraction patterns 104. Thus, constructive interference may occur so that the condensed light to the focal point 106 passing through the EUV projection lens 100 may increase.

The height H of the diffraction patterns 104 at which EUV light may be out of phase (hereinafter, referred to as "out-of phase height") may vary according to a refractive index of a material of the diffraction patterns 104. Particularly, the out-of phase height H of the diffraction patterns 104 may be obtained by a following equation.

$$H=\lambda/(2(1-n))$$

($\lambda$: wavelength of incident light, n: refractive index of diffraction pattern)

When the Incident Light is an EUV Light, $\lambda$ may be in a Range of about 13 nm to about 14 nm.

As a height of diffraction patterns becomes larger, forming the diffraction patterns to have a fine line width by a patterning process may not be easy.

Referring to the equation above, when the refractive index of the diffraction patterns 104 is close to 1, the out-of phase height H of the diffraction patterns 104 may be reduced.

In example embodiments, the out-of phase height H of the diffraction patterns 104 may be less than about 80 nm, preferably, in a range of about 50 nm to about 65 nm. When the diffraction patterns 104 includes, e.g., ruthenium (Ru), palladium (Pd), silver (Ag), etc., the out-of phase height H may be smaller than about 80 nm.

In example embodiments, the height H of the diffraction patterns 104 may be substantially the same at all positions thereof. Additionally, the diffraction patterns 104 may have a substantially vertical sidewall.

The diffraction patterns 104 may include a material for which EUV light may have high transmittance at the out-of phase height so that the amount of the first order diffraction lights may be increased. If the transmittance of EUV light is low, EUV light condensed at the focal point 106 may have a very small amount. A transmittance of EUV light for the diffraction patterns 104 may have, preferably, higher than about 50% at the out-of phase height H.

For example, when the diffraction patterns 104 include beryllium (Be), boron (B), carbon (C), strontium (Sr), yttrium (Y), zirconium (Zr), niobium (Nb), molybdenum (Mo), ruthenium (Ru), etc., EUV light may have a transmittance higher than about 50% at the out-of phase height H. However, when the height H is larger than about 80 nm, the diffraction patterns 104 may not be easily formed.

When the diffraction patterns 104 includes ruthenium (Ru) having a refractive index of about 0.889, the out-of phase height H of the diffraction patterns 104 may be in a range of about 45 nm to 65 nm. Thus, in example embodiments, the diffraction patterns 104 may include ruthenium (Ru).

When the diffraction patterns includes ruthenium, a zero order diffraction light and a second order diffraction light at the out-of phase height H may have a very low amount, and thus noises due to the zero and second order diffraction lights may be generated very little. Moreover, ruthenium may be hardly polluted by EUV light.

For example, when EUV light passes through an EUV projection lens including diffraction patterns having a height in a range of about 50 nm to about 65 nm on a substrate having a thickness of about 100 nm, a first order diffraction light may have an efficiency of about 12%.

As illustrated above, the EUV projection lens 100 in accordance with example embodiments may have a high first order diffraction light efficiency so that condensed EUV light may have an increased amount and a light source power of the EUV light may be reduced. Additionally, the EUV projection lens 100 may include the diffraction patterns 104 having a small height and line-width so that an optic system using the EUV projection lens 100 may have high resolution.

The EUV projection lens 100 may be manufactured by a following method.

Figure 4:
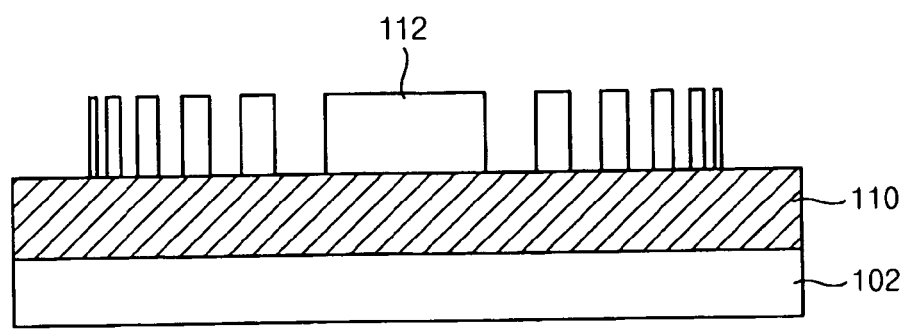
FIG. 4 is a cross-sectional view illustrating a method of forming the EUV projection lens in FIG. 2 in accordance with example embodiments.

FIG. 4 is a cross-sectional view illustrating a method of manufacturing the EUV projection lens 100 in FIG. 2 in accordance with example embodiments.

Referring FIG. 4, a substrate 102 having a thin thickness, e.g., of about 50 nm to about 100 nm may be provided. The substrate 102 may be formed using silicon nitride (e.g. $Si_3N_4$).

A layer 110 for forming diffraction patterns may be formed on the substrate 102. The layer 110 may be formed using a material having a transmittance higher than about 50% for EUV light at an out-of phase height. The layer 110 may be formed using a material having an out-of phase height smaller than about 80 nm. In example embodiments, the layer 110 may be formed using ruthenium at a thickness in a range of about 50 nm to 65 nm.

A mask 112 may be formed on the layer 110. The mask 112 may include concentric patterns having line widths and spaces therebetween decreasing according to the distance from the central portion of the substrate 102.

The layer 110 may be partially removed using the mask 112 as an etching mask to form diffraction patterns 104. Top surfaces of the substrate 102 between the diffraction patterns 104 may be exposed. Sidewalls of the diffraction patterns 104 may be formed to be vertical to the substrate 102. The layer 110 may be easily patterned because the layer 110 may have a small thickness in a range of about 50 nm to 65 nm.

The mask 112 may be removed after forming the diffraction patterns 104 to complete the EUV projection lens 100.

Optic System

Figure 5:
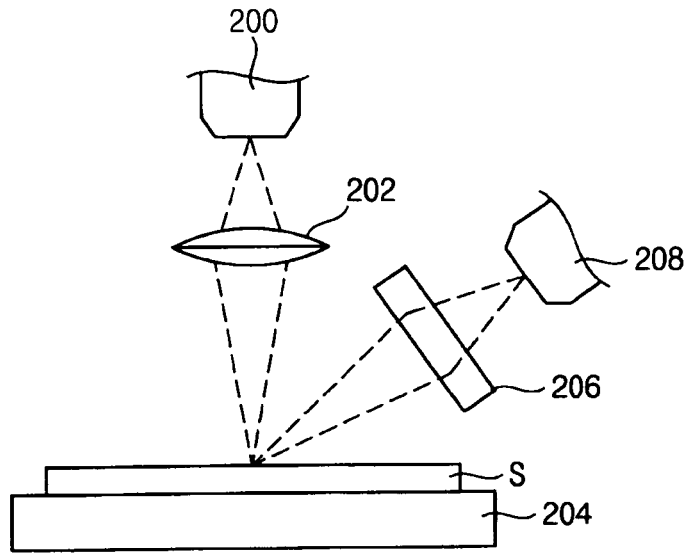
FIG. 5 is a block diagram illustrating an optic system in accordance with example embodiments.

FIG. 5 is a block diagram illustrating an optic system in accordance with example embodiments.

The optic system may include the EUV projection lens 100 of FIGS. 1 and 2. The optic system may be applied for inspecting samples using an EUV light as a light source.

Referring to FIG. 5, the optic system may include an EUV light source 200, a stage 204, a condenser lens 202, a detector 208 and an object lens 206.

The EUV light source 200 may generate high temperature plasma by exciting an EUV radiation species (i.e., a source of the high temperature plasma) and emit EUV light collected from the plasma. For example, the EUV light source 200 may include a laser light source, an illumination system having an optical lens, a supply pipe providing the source of the high temperature plasma, a plasma generator in which the plasma source is generated by laser, and a filter emitting the EUV light collected from the plasma source.

The stage 204 may be spaced apart from the EUV light source 200, and a test sample S may be loaded on the stage 204. The test sample S may include a photomask that may be used in a photolithography process using EUV light as a light source. The stage 204 is movable horizontally or vertically so that the test sample S on the stage 204 may be scanned for inspection.

The condenser lens 202 may be disposed between the EUV light source 200 and the stage 204, and may provide EUV light emitted from the EUV light source 200 to the test sample S. That is, the EUV light from the EUV light source 200 may pass through the condenser lens 202 and concentrates onto the test sample S. The condenser lens 202 may include a plurality of reflective mirrors.

The detector 208 may be provided to receive EUV light. The detector 208 may receive EUV light reflected from the test sample S to convert the EUV light into an electrical signal, e.g., a voltage. An image of the test sample S or an intensity of the EUV light may be detected using the electrical signal.

The objective lens 206 may be disposed between the stage 204 and the detector 208 to condense the light reflected from the test sample S and provide the reflected light to the detector 208. The objective lens 206 may include the EUV projection lens 100 of FIGS. 1 and 2. Thus, object lens 206 may condense the EUV light reflected from the test sample S to the detector 208.

The object lens 206 including the EUV projection lens 100 may be cheaper than that including reflective mirrors.

The EUV projection lens 100 may have high first order diffraction light efficiency of EUV light, and thus the EUV light reflected from the test sample S may be condensed sufficiently to the detector 208 so that the test sample S may be efficiently inspected. By using the EUV projection lens 100 as the objective lens 206, the amount of light condensed to the detector 208 and a signal-to-noise ratio may be increased so that the test sample S may be inspected more precisely.

Inspection of a Photomask

Figure 6:
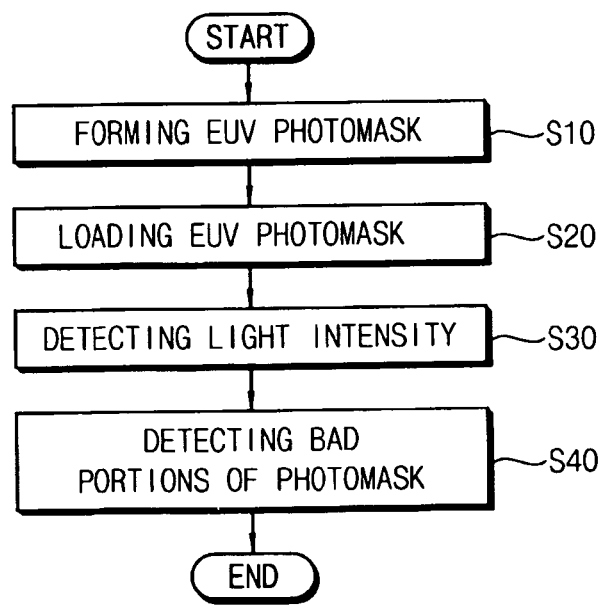
FIG. 6 is a block diagram illustrating a method of inspecting a photomask using an optic system in accordance with example embodiments.
Figure 7A:
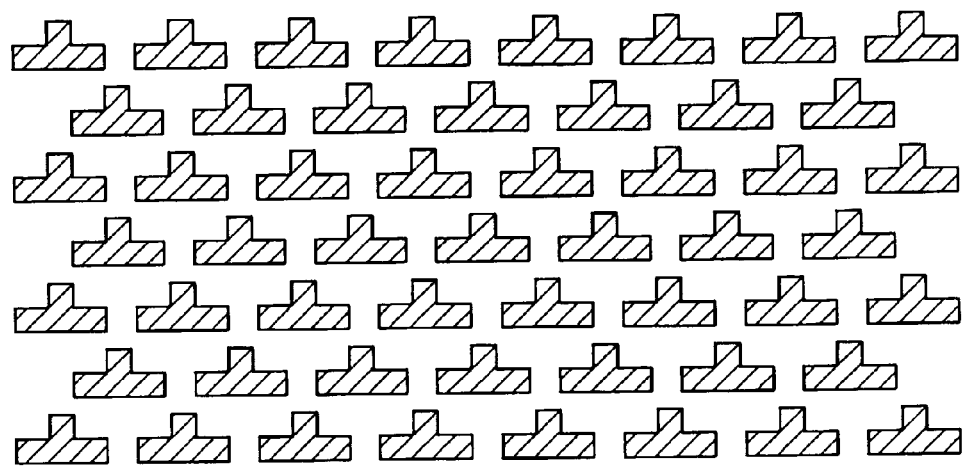
FIGS. 7A and 7B are schematic views illustrating circuit patterns in accordance with example embodiments.
Figure 7B:
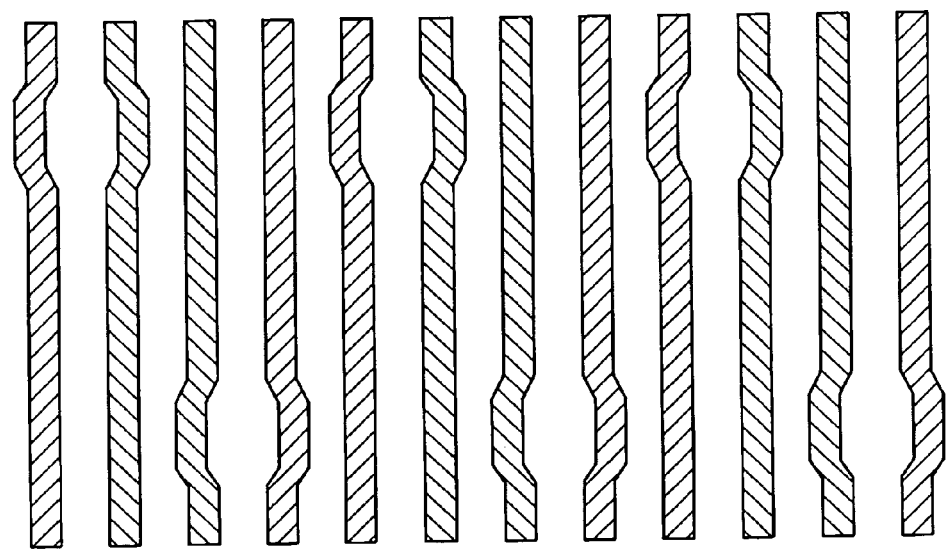

FIG. 6 is a block diagram illustrating a method of inspecting a photomask using the optic system of FIG. 5 in accordance with example embodiments. FIGS. 7A and 7B are top views illustrating patterns in accordance with example embodiments.

Referring to FIGS. 5 and 6, in step S10, a photomask for an exposure process using a EUV light source may be formed. The photomask may include patterns for forming circuits in a semiconductor device. As shown in FIGS. 7A and 7B, the patterns may have shapes substantially the same as each other.

An inspection process may be performed to determine whether the patterns have desired shapes. An optic system using a light source having a longer wavelength than an EUV light may not be used for the inspection process of the patterns of the EUV photomask. Thus, an optic system using an EUV light source may be used for the inspection process.

In step S20, the photomask may be loaded on the stage 204 of the optic system. The detector 208 may detect an intensity of light reflected from the photomask on the stage 204. The stage 204 may be moved so that the photomask may be scanned and the light intensity may be detected.

In step S40, the patterns of the photomask may be inspected to determine whether the patterns have desired shapes by a spectrum of the light intensity. Particularly, the spectrum of the light intensity may be compared to a spectrum of a light intensity previously obtained from a photomask including desired patterns. Bad portions of the patterns in which an error with respect to the desired patterns exceed a certain range may be detected. The bad portions of the patterns may be inspected again to determine whether the photomask has been really formed to have a desire shape.

As illustrated above, an EUV projection lens of the optic system may have a high first order diffraction light efficiency so that condensed EUV light may have an increased amount and a light source power of the EUV light may be reduced. Additionally, the EUV projection lens may have a very low zero and second order diffraction light efficiencies, and thus noises due to the zero and second order diffraction lights may be generated very little. Accordingly, the photomask may be inspected more precisely with high reliability.

Measurement of Transmittance of EUV Light at an Out-of Phase Height

As described above, diffraction patterns of an EUV projection lens may be formed to have a small out-of phase height using some materials, and EUV light may have high transmittance through diffraction patterns at the out-of phase height when the diffraction patterns include some materials. Out-of phase heights of some materials and transmittances of EUV light through diffraction patterns including the materials at the out-of phase heights were measured in order to find proper materials for the diffraction patterns of the EUV projection lens.

Figure 8:
FIG. 8 is a graph showing an out-of phase height and a transmittance at the out-of phase height in each atom.

FIG. 8 is a graph showing out-of phase heights of diffraction patterns including some atoms and transmittances of EUV light through the diffraction patterns including the atoms at the out-of phase heights. In FIG. 8, reference numeral 250 indicates the out-of phase heights of the diffraction patterns, and reference numeral 252 indicates the transmittances of EUV light through the diffraction patterns at the out-of phase heights.

As shown in FIG. 8, diffraction patterns including ruthenium (Ru), palladium (Pd), silver (Ag), and the like had out-of phase heights lower than about 80 nm. EUV light had transmittances through diffraction patterns at the out-of phase heights higher than about 50% when the diffraction patterns included Beryllium (Be), boron (B), carbon (C), strontium (Sr), yttrium (Y), zirconium (Zr), niobium (Nb), molybdenum (Mo), ruthenium (Ru), and the like.

In the above measurement, the diffraction pattern including ruthenium had a small out-of phase height, and EUV light had a high transmittance through the diffraction pattern including ruthenium at the out-of phase height.

Experiment on a First Order Diffraction Light Efficiency

First order diffraction light efficiencies of Example and Comparative Example were measured. Example was an EUV projection lens having diffraction patterns including ruthenium and having an out-of phase height, and Comparative Example was an EUV projection lens having diffraction patterns including gold (Au) and having an out-of phase height.

EXAMPLE

The EUV projection lens of Example had a structure substantially the same as that of FIGS. 1 to 3. Particularly, the EUV projection lens had diffraction patterns on a substrate including silicon nitride ($Si_3N_4$) and having a thickness of about 100 nm. The diffraction patterns included ruthenium, and concentric patterns of the diffraction patterns had a height of about 55 nm.

Comparative Example

The EUV projection lens of Comparative Example had diffraction patterns on a substrate including silicon nitride ($Si_3N_4$) and having a thickness of about 100 nm. The diffraction patterns included gold (Au) and concentric patterns of the diffraction patterns had a height of about 100 nm, i.e., the out-of phase height of the diffraction patterns including gold (Au). EUV light had a transmittance through the diffraction patterns of gold lower than about 10% at the out-of phase height.

EUV light having a wavelength of about 13.5 nm was incident to each of the EUV projection lenses of Example and Comparative Example. First order diffraction light efficiencies were measured according to widths of concentric patterns of Example and Comparative Example.

Figure 9:
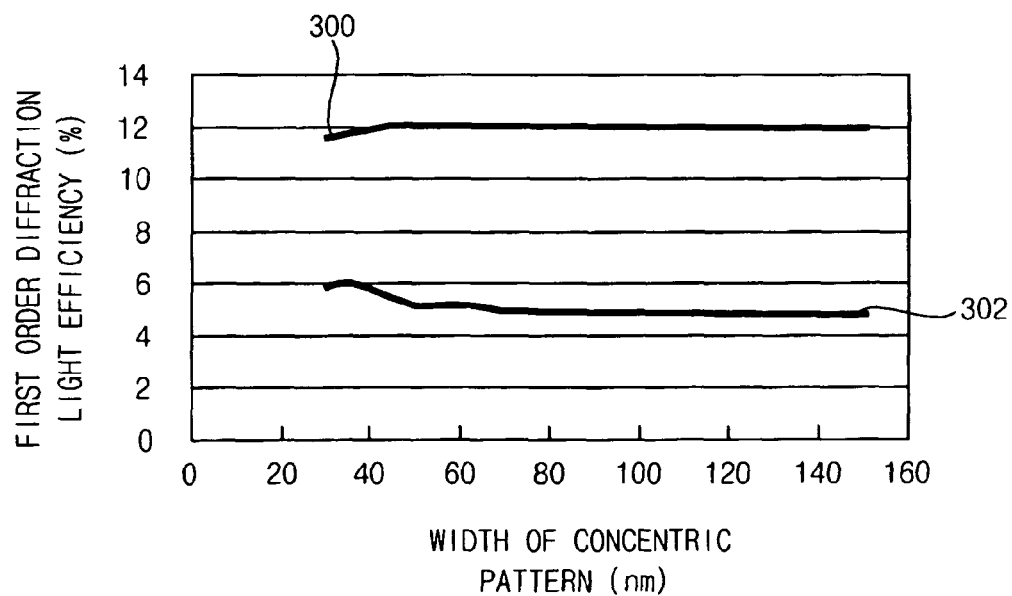
FIG. 9 is a graph showing first order diffraction light efficiencies of a sample and a comparative sample when the EUV light having a wavelength about 13.5 nm is radiated.

FIG. 9 is a graph showing the first order diffraction efficiencies of Example and Comparative Example when EUV light having a wavelength of about 13.5 nm was incident thereto. In FIG. 9, reference numeral 300 indicates the first order diffraction light efficiency of Example, and reference numeral 302 indicates the first order diffraction light efficiency of Comparative Example.

Referring to FIG. 9, the first order diffraction light efficiency of Example was about 12%, and the deviation of the efficiency according to the widths of the concentric patterns was very small. The first order diffraction light efficiency of Comparative Example was about 4.8%, and the deviation of the efficiency according to the widths of the concentric patterns was relatively large.

As illustrated above, the EUV projection lens in accordance with example embodiments may have an improved first order diffraction large efficiency. Additionally, the EUV projection lens may include diffraction patterns having a small height of about 55 nm so that the diffraction patterns having a fine line width may be easily formed.

Experiment on First and Second Order Diffraction Light Efficiencies According to Heights of Diffraction Patterns First and second order diffraction light efficiencies were measured according to heights of diffraction patterns including ruthenium in EUV projection lenses.

The EUV projection lenses used in the experiment had a structure substantially the same as each other except for heights of the patterns. Particularly, each EUV projection lens in the experiment had diffraction patterns on a substrate including silicon nitride ($Si_3N_4$) and having a thickness of about 200 nm. The diffraction patterns included ruthenium.

The heights of diffraction patterns in each EUV projection lens were in a range of about 1 nm to 100 nm.

First and second order diffraction efficiencies were measured according to the heights of the EUV projection lens. The first and second diffraction light efficiencies were measured at a portion in which a pitch of the diffraction patterns was about 129 nm.

Figure 10:
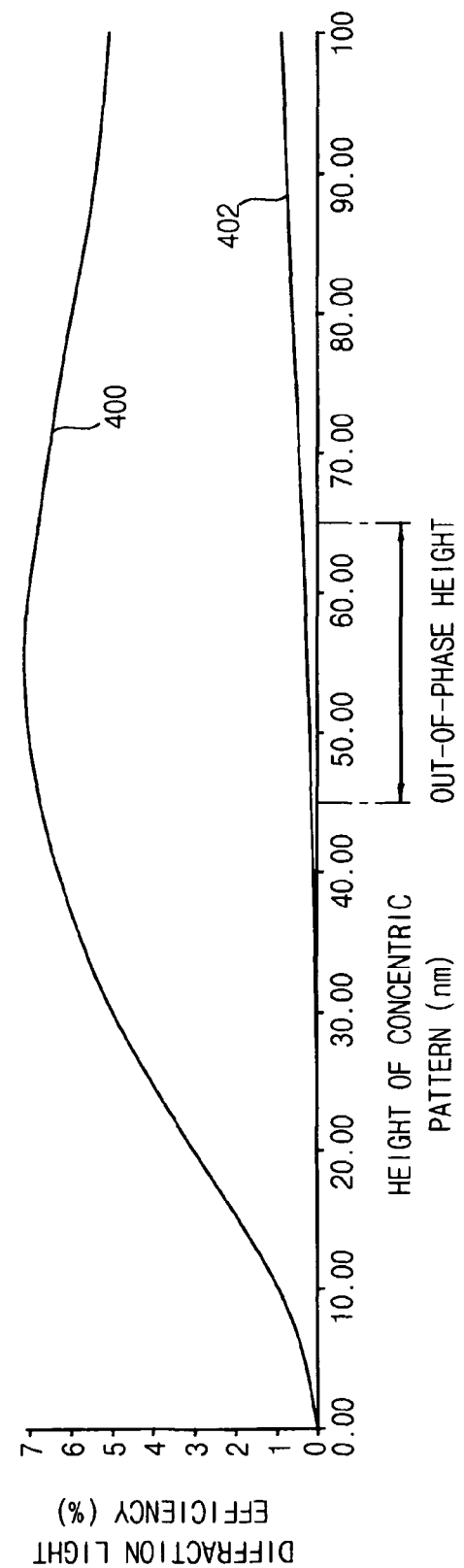
FIG. 10 is a graph showing first and second diffraction light efficiencies measured from the EUV projection lenses varying the height of the diffraction patterns.

FIG. 10 is a graph showing the first and second diffraction light efficiencies measured from the EUV projection lens according to heights of the diffraction patterns.

In FIG. 10, reference numeral 400 indicates the first order diffraction light efficiencies of each EUV projection lens, and reference numeral 402 indicates the second diffraction efficiencies of each EUV projection lens.

Referring to FIG. 10, when the diffraction patterns including ruthenium had a height in a range of about 45 nm to about 65 nm, i.e., the out-of phase height of the diffraction patterns, the first order diffraction light efficiency reached the highest value and the second order diffraction efficiency remained low.

When the height of the diffraction patterns was less than about 45 nm, the first order diffraction light efficiency was reduced. When the height of the diffraction patterns was more than about 65 nm, the first order diffraction light efficiency was reduced and the second order light efficiency increased.

Particularly, when the height of the diffraction patterns was about 55 nm, the first order diffraction light efficiency was about 7%. When the height of the diffraction patterns was about 100 nm, the first order diffraction light efficiency was about 5%. Meanwhile, when the height of the diffraction patterns was about 55 nm, the second order diffraction light efficiency was about 0.2%. When the height of the diffraction patterns was about 100 nm, the second order diffraction light efficiency was about 0.9%.

Consequently, the diffraction patterns including ruthenium may have a high first order diffraction light efficiency and a low second order diffraction efficiency at the out of phase height. Thus, noises due to the second order diffraction light may be generated very little so that a signal-to-noise ratio may be increased.

The EUV projection lens according to example, embodiments may have a high transmittance and a high first order diffraction light efficiency of EUV light. Additionally, diffraction patterns may be formed to have a small height so that the EUV projection lens may have a fine diffraction pattern structure.

An amount of the EUV light passing through the EUV projection lens may be increased by using an optic system including the EUV projection lens. Accordingly, a light source power of the optic system may be reduced and a signal-to-noise ratio may be increased.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An EUV projection lens, comprising:
   a substrate; and
   concentric diffraction patterns on the substrate, the concentric diffraction patterns having an out-of phase height with respect to EUV light and including a material through which the EUV light has a transmittance higher than about 50% at the out-of phase height, wherein the out-of phase height is determined by $\lambda/(2(1-n))$, where $\lambda$ is a wavelength of the incident EUV light and n is a refractive index of the material,
   wherein the material consists essentially of ruthenium.

2. The EUV projection lens of claim 1, wherein the concentric diffraction patterns have an overall height of less than about 80 nm.

3. The EUV projection lens of claim 2, wherein the concentric diffraction patterns have a height of about 45 nm to about 65 nm.

4. The EUV projection lens of claim 1, wherein line widths of and distances between the concentric diffraction patterns become smaller as the concentric diffraction patterns are more distant from a central portion of the substrate.

5. The EUV projection lens of claim 4, wherein an outermost pattern of the concentric diffraction patterns have a line width of about 30 nm to about 100 nm, and a distance between the outermost pattern and an adjacent pattern of the concentric diffraction pattern is in a range of about 30 nm to about 100 nm.

6. The EUV projection lens of claim 1, wherein the concentric diffraction patterns have a height substantially the same as each other.

7. The EUV projection lens of claim 1, wherein sidewalls of the concentric diffraction patterns are vertical to the substrate.

8. The EUV projection lens of claim 1, wherein the concentric diffraction patterns have a disk pattern on the central portion of the substrate and a plurality of concentric patterns around the disk pattern.

9. The EUV projection lens of claim 1, wherein the concentric diffraction patterns having a disk pattern on a central portion of the substrate and a plurality of concentric patterns around the disk pattern, wherein spaces exposing a top surface of the substrate are provided at least one of between the concentric diffraction patterns and between the disk pattern and an innermost one of the concentric diffraction patterns.

10. The EUV projection lens of claim 1, wherein a thickness of the substrate is in a range of about 50 nm to about 200 nm, and a first order diffraction light passes through an EUV projection lens have an efficiency higher than about 5%.

11. The EUV projection lens of claim 1, wherein the substrate includes silicon nitride.

12. An optic system, comprising:
   a light source emitting EUV light;
   a detector receiving the EUV light;
   a stage on which a test sample is loaded, the stage spaced apart from the light source;
   a condenser lens disposed between the light source and the stage, the condenser lens concentrating the EUV light emitted from the light source to provide the concentrated EUV light to the test sample; and
   an EUV projection lens,
   wherein the EUV light is configured to pass through the condenser lens and to be reflected on the test sample, the EUV projection lens is configured to condense and provide the reflected EUV light to the detector,
   the EUV projection lens includes concentric diffraction patterns on a substrate and is on a different optical axis from an axis between the condenser lens and the stage, the concentric diffraction patterns having an out-of phase height with respect to the EUV light and including a material through which the EUV light has a transmittance higher than about 50% at the out-of phase height, and
   the material consists essentially of ruthenium.

13. The optic system of claim 12, wherein the test sample includes a photomask usable in a photolithography process using EUV light as a light source.

14. The optic system of claim 12, wherein the concentric diffraction patterns have a height of less than about 80 nm.

15. The optic system of claim 14, wherein the concentric diffraction patterns have a height in a range of about 45 nm to about 65 nm.

16. The optic system of claim 12, wherein line widths of and distances between the concentric diffraction patterns become smaller as the concentric diffraction patterns are more distant from a central portion of the substrate.

17. The optic system of claim 12, wherein an outermost pattern of the concentric diffraction patterns have a line width of about 30 nm to about 100 nm, and a distance between the outermost pattern and an adjacent pattern of the concentric diffraction pattern is in a range of about 30 nm to about 100 nm.

18. The optic system of claim 12, wherein the concentric diffraction patterns have a height substantially the same as each other.

19. The optic system of claim 12, wherein sidewalls of the concentric diffraction patterns are vertical to the substrate.

20. The optic system of claim 12, wherein the concentric diffraction patterns have a disk pattern on the central portion of the substrate and a plurality of concentric patterns around the disk pattern.

21. An EUV projection lens, comprising:
   a substrate; and
   concentric diffraction patterns on the substrate, the concentric diffraction patterns having an out-of phase height with respect to EUV light and including a material through which the EUV light has a transmittance higher than about 50% at the out-of phase height, wherein the out-of phase height is determined by $\lambda/(2(1-n))$, where $\lambda$ is a wavelength of the incident EUV light and n is a refractive index of the material,
   wherein the concentric diffraction patterns have an overall height of less than about 80 nm.

* * * * *